United States Patent
Kao et al.

(10) Patent No.: US 7,539,125 B2
(45) Date of Patent: May 26, 2009

(54) METHOD AND CIRCUIT FOR FREQUENCY OFFSET ESTIMATION IN FREQUENCY DOMAIN IN THE ORTHOGONAL FREQUENCY DIVISION MULTIPLEXING BASEBAND RECEIVER FOR IEEE 802.11A/G WIRELESS LAN STANDARD

(75) Inventors: Kai-Pon Kao, Hsinchu (TW); ChinGwo Ma, Taipei (TW)

(73) Assignee: Via Technologies, Inc., Taipei (TW)

( * ) Notice: Subject to any disclaimer, the term of this patent is extended or adjusted under 35 U.S.C. 154(b) by 564 days.

(21) Appl. No.: 11/250,669

(22) Filed: Oct. 14, 2005

(65) Prior Publication Data

US 2007/0086328 A1    Apr. 19, 2007

(51) Int. Cl.
    *H04J 11/00* (2006.01)
(52) U.S. Cl. .............. 370/208; 370/203; 375/140; 375/260
(58) Field of Classification Search .......... 370/208, 370/203; 375/140, 260
    See application file for complete search history.

(56) References Cited

U.S. PATENT DOCUMENTS

| | | | | |
|---|---|---|---|---|
| 5,150,380 A | * | 9/1992 | Okanoue | 375/236 |
| 5,255,290 A | * | 10/1993 | Anvari | 375/344 |
| 7,106,709 B2 | * | 9/2006 | Davidsson et al. | 370/330 |
| 2002/0145971 A1 | * | 10/2002 | Cho et al. | 370/208 |
| 2003/0058968 A1 | * | 3/2003 | Thomson et al. | 375/340 |
| 2003/0210645 A1 | * | 11/2003 | Gummadi et al. | 370/203 |
| 2004/0042385 A1 | * | 3/2004 | Kim et al. | 370/203 |
| 2004/0190637 A1 | * | 9/2004 | Maltsev et al. | 375/260 |
| 2004/0202234 A1 | * | 10/2004 | Wang | 375/149 |
| 2007/0133611 A1 | * | 6/2007 | Li et al. | 370/503 |

FOREIGN PATENT DOCUMENTS

CN    1564468    1/2005

OTHER PUBLICATIONS

CN Office Action mailed Sep. 26, 2008.
English Abstract of CN1564468.

* cited by examiner

*Primary Examiner*—Ricky Ngo
*Assistant Examiner*—Luat Phung
(74) *Attorney, Agent, or Firm*—Thomas, Kayden, Horstemeyer & Risley

(57) ABSTRACT

A method for frequency offset estimation in frequency domain is provided. The method comprises the following steps. First, a phase angle of a signal field of the input signal after processed by Fast Fourier Transformation (FFT) and channel equalization is calculated. A frequency offset error originated from at least one frequency offset estimation process in time domain is then estimated according to the phase angle.

3 Claims, 8 Drawing Sheets

METHOD AND CIRCUIT FOR FREQUENCY OFFSET ESTIMATION IN FREQUENCY DOMAIN IN THE ORTHOGONAL FREQUENCY DIVISION MULTIPLEXING BASEBAND RECEIVER FOR IEEE 802.11A/G WIRELESS LAN STANDARD

BACKGROUND

The present invention relates to the baseband processor of the orthogonal frequency division multiplexing (OFDM) receiver, and more particularly, to an OFDM baseband processor for the wireless LAN (WLAN) IEEE 802.11a or IEEE 802.11g standards.

Orthogonal frequency division multiplexing (OFDM) is a modulation technique for wireless LAN standards such as IEEE 802.11a and 802.11g. In the IEEE 802.11a standard, the carrier frequency is 5 GHz. There are 64 implied subcarrier frequencies with a spacing of 312.5 kHz (=20 MHz/64, wherein 20 MHz is the channel bandwidth). Among the 64 implied subcarriers, there are 52 nonzero subcarriers, which includes 48 data subcarriers carrying data and four pilot subcarriers used as pilot tones. Each subcarrier hums away at 312.5k symbols/second. Data is blocked into 3.2-microsecond frames with an additional 0.8 microsecond of cyclic prefix tacked on for mitigation of intersymbol interference, and the data frame and the cyclic prefix thereof forms a data symbol lasting for 4 μs. A 64-point fast Fourier transform is performed over 3.2 microseconds to extract the 48 data symbols on the 48 QAM signals. For binary phase-shift keying (BPSK), with 1 bit per symbol, that is 48 bits in 4 microseconds, for an aggregate data rate of 12 Mbits/s. Half-rate convolutional coding brings the net rate down to 6 Mbits/s. For 64 QAM, the aggregate data rate is six times higher, or 72 Mbits/s.

FIG. 1 illustrates the main function blocks of the transmitter end 100 of the OFDM baseband processor according to the IEEE 802.11a standard. The main function blocks of the transmitter end include a signal mapper 102, a serial to parallel converter 104, an inverse fast Fourier transform (IFFT) block 106, a parallel to serial converter 108, a cyclic prefix (CP) adding block 110, a digital to analog converter (DAC) 112, and a radio frequency (RF) transmitter 114. OFDM is a multi-carrier modulation technique. First, the data stream is modulated with signal mapper 102 using modulation techniques such as Quadrature Amplitude Modulation (QAM) or Binary Phase Shift keying (BPSK). The next step in OFDM modulation is to convert the serial data into parallel data streams with the serial to parallel converter 104. The Inverse Fast Fourier transform (IFFT) is performed on the modulated data with the IFFT block 106. The IFFT is at the heart of the OFDM modulation, as it provides a simple way to modulate data streams onto orthogonal subcarriers. The data streams before and after IFFT are designated as X[n] and x[n] to represent frequency domain data and time domain data respectively, wherein n represents the order number of the subcarriers. After the IFFT, the parallel data streams are concatenated into a single data stream by the parallel to serial converter 108. Finally a characteristic cyclic prefix (CP) is added to each OFDM symbol being transmitted in the single data stream with the cyclic prefix adding block 110. The OFDM symbol is now ready, and after conversion from digital to analog form by the DAC 112 and modulation by the RF transmitter with a carrier frequency fc, the symbol is sent over channel 150 as RF signals to the receiver end.

FIG. 2 illustrates the main function blocks of the receiver end 200 of the OFDM baseband processor according to the IEEE 802.11a standard. The main function blocks of the receiver end 200 include a RF receiver 202, a sampler 204, a synchronization block 206, a cyclic prefix remover 208, a serial to parallel converter 210, a fast Fourier transform (FFT) block 212, a channel estimation and equalization block 214, a parallel to serial converter 216, and a signal demapper 218. The receiver end 200 performs the inverse of the transmitter end 100. After transmitting through channel 150, the signal is received by the RF receiver 202 with carrier frequency fc'. The received signal is then passed to the sampler 204 and sampled. Then, the data samples are compensated for carrier frequency offset (CFO) with the CFO correction block 226 inside the synchronization block 206 wherein the CFO is caused by the difference between the carrier frequency of transmitter end 100 and receiver end 200 (fc and fc'). The other function blocks inside the synchronization block 206 are frame detection block 220 and timing synchronization block 224. Frame detection detects the symbol frame of the data samples, and timing synchronization detects the symbol boundary of the data samples inside a data frame. The receiver end 200 must determine the symbol boundary to ensure that only the signal part of every OFDM symbol is written into the FFT and no part of the cyclic prefix. Implementing timing synchronization can also avoid Inter Symbol Interference (ISI) caused by sampling timing errors. After the cyclic prefix of symbols are removed with the CP removal block 208, the data samples are converted form serial to parallel, and applied to the FFT block 212. The Fast Fourier Transform (FFT) converts the time domain samples back into a frequency domain. Because the signal through channel 150 has suffered from frequency selective attenuation, the data samples are passed to the channel estimation and equalization block 214 to equalize the attenuation. The parallel to serial converter block 216 converts the parallel data samples into a serial data stream. Finally, the data stream is demodulated with QAM or BPSK schemes by signal demapper 218 to recover the original input data.

FIG. 3 shows the OFDM burst mode frame structure 300 which actually has four distinct regions. The first is the short preamble 302. This is followed by a long preamble 304 and, finally, by the signal symbol 306 and data symbols 308. Guard intervals 312, 314, 316 and 318 are inserted between each burst section. The short preamble 302 consists of 10 identical short OFDM training symbols 322, and each short training symbol 322 lasts for 0.8 μs and contains 16 data samples. The long preamble 304 consists of two identical long training symbols (LTS) 324 and 326, and each long training symbol lasts for 3.2 μs and contains 64 data samples. Between the short and long OFDM symbols, there is a guard interval (GI2) 312 of length 1.6 μs (32 data samples) that constitutes the cyclic prefix of the long symbols. Short training symbol 302 is used for frame detection, coarse timing synchronization, and carrier frequency offset (CFO) estimation. Long training symbols 324 and 326 are used for fine timing synchronization and channel estimation. Signal symbol 328 contains information about data rate, data length, and modulation scheme. Data symbols 330 and 332 contain the payload data and are of variable length.

There are many sources of frequency offset in wireless systems. The main sources are the difference between local oscillators at the transmitter and the receiver and the Doppler shift. The frequency offset destroys the orthogonality between the OFDM symbol subcarriers and introduces inter-channel interference (ICI) at the output of the OFDM demodulator. Therefore the CFO correction block 226 shown in FIG. 2 is required to compensate the samples for CFO. FIG. 4 shows a delay correlation circuit 400 for implementing frequency offset estimation in time domain with short preamble 302 or long preamble 304, and the delay correlation circuit 400 can be used for realizing the CFO correction block 226 shown in FIG. 2. The samples are delivered to a delay line 402 which delays the samples for N sampling periods, and the number N is determined with the number of samples of the short training symbol 322 (N=16) or the long training symbol 324 or 326 (N=64). The conjugate of the delayed sample from a conjugate block 404 is then multiplied by the current sample with a complex multiplier 406 to generate a product value. The adder 410 and the delay block 412 then accumulate the product value, and a delayed product value from another delay line 408 is subtracted from the accumulated value from delay block 412. The remainder is then delivered to a phase calculator 416 for retrieving its phase angle, and the phase angle is then averaged to generate the estimated frequency offset.

However, there is still some remnant CFO uncompensated in the traditional method. Because the OFDM system is far more vulnerable to the carrier frequency offset than single-carrier systems, even the remnant CFO of a small fraction of the subcarrier spacing can cause serious performance degradation if not properly compensated. Hence, there is a need for estimating the frequency offset of signals in frequency domain (after FFT) to reduce the error of the prior frequency offset estimation in time domain.

SUMMARY

Therefore the present invention provides a method and circuit for frequency offset estimation in frequency domain for a receiver of an orthogonal frequency division multiplexing (OFDM) system for IEEE 802.11a or 802.11g wireless local area network (LAN) standards, and an input signal of the receiver of the OFDM system is transmitted via 52 subcarriers.

A method for frequency offset estimation in the frequency domain is provided. An exemplary embodiment of a method comprises the following steps. First, a phase angle of a signal field of the input signal after processed by Fast Fourier Transformation (FFT) and channel equalization is calculated. A frequency offset error originating from at least one frequency offset estimation process in time domain is then estimated according to the phase angle.

A circuit for frequency offset estimation in the frequency domain is also provided. An exemplary embodiment of a circuit comprises a fast Fourier transformation module, for processing the input signal with fast Fourier transformation (FFT) to generate a first signal. The circuit also comprises a channel estimation module, coupled to the fast Fourier transformation module, for estimating a channel estimation coefficient of a k-th subcarrier of the 52 subcarriers, wherein the index k ranges from 1 to 52 and represents the order of subcarrier.

The circuit also comprises: an equalizer, coupled to the fast Fourier transformation module and the channel estimation module, for compensating the first signal for channel distortion with the channel estimation coefficient to generate a second signal; a square circuit, coupled to the channel estimation module, for calculating a square of an absolute value of the channel estimation coefficient of the k-th subcarrier; a multiplier, coupled to the equalizer and the square circuit, for multiplying the signal field of the second signal on the k-th subcarrier by its real part and the square of the absolute value of the channel estimation coefficient of the k-th subcarrier to generate a product value of the k-th subcarrier; an accumulator, coupled to the multiplier, for accumulating the product value of all 52 subcarriers to generate an accumulation value; an ArTan module, coupled to the accumulator, for calculating a phase angle of the accumulation value. Thus, a frequency offset error originating from at least one frequency offset estimation process in the time domain can be estimated according to the phase angle.

DESCRIPTION OF THE DRAWINGS

The invention can be more fully understood by reading the subsequent detailed description in conjunction with the examples and references made to the accompanying drawings, wherein.

DETAILED DESCRIPTION

Figure 1:
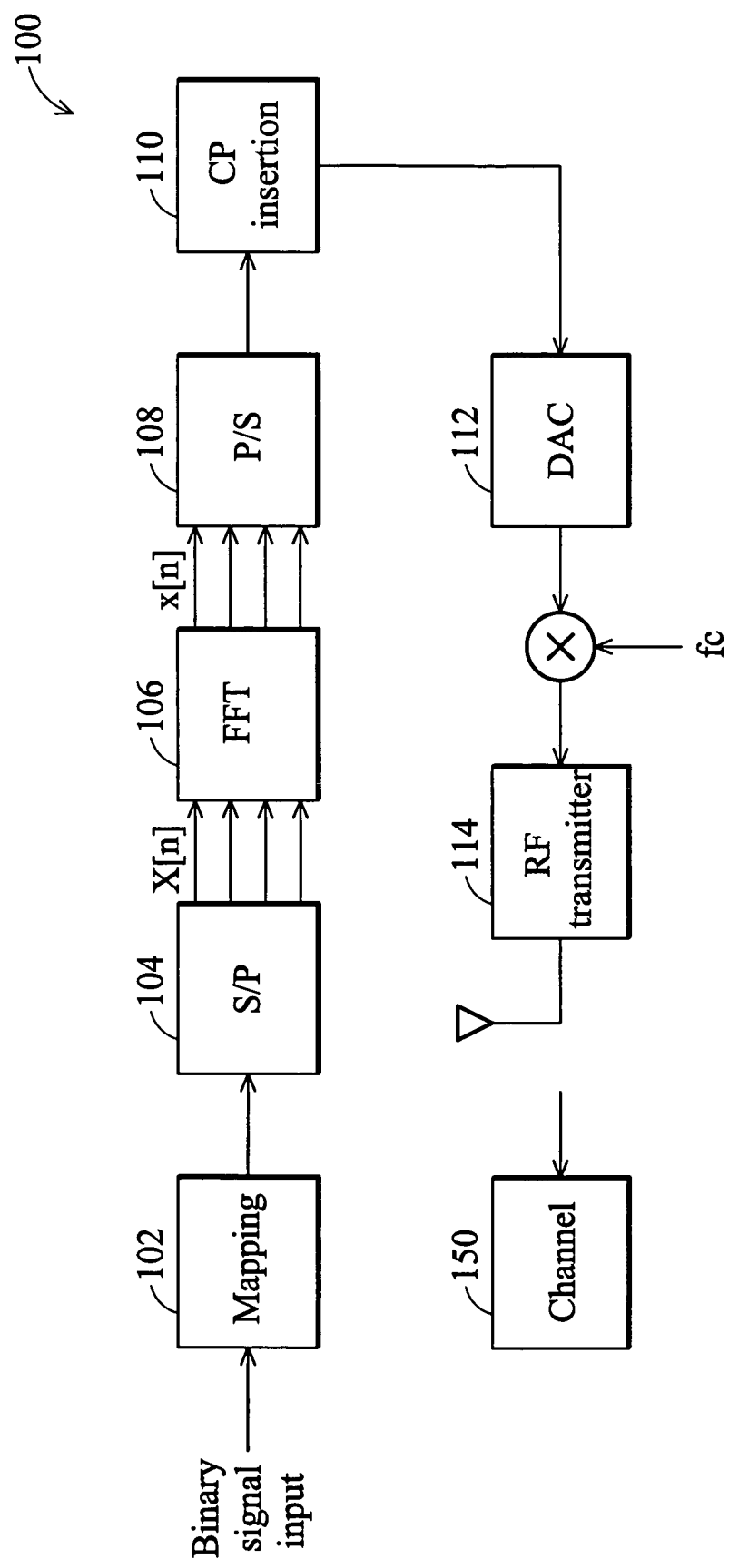
FIG. 1 illustrates the main function blocks of the transmitter end of the OFDM baseband processor according to the IEEE 802.11a standard.
Figure 2:
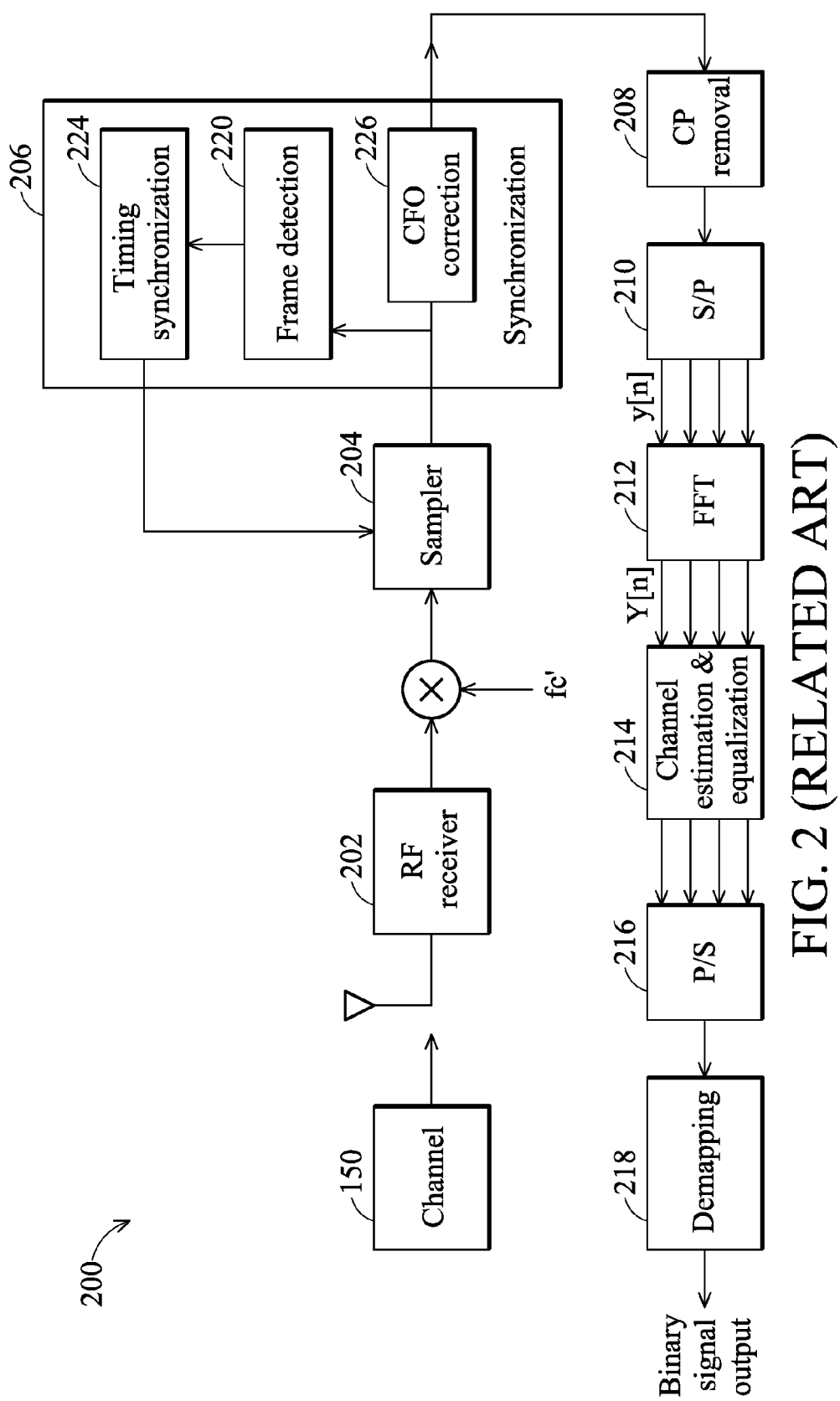
FIG. 2 illustrates the main function blocks of the receiver end of the OFDM baseband processor according to the IEEE 802.11a standard.
Figure 3:
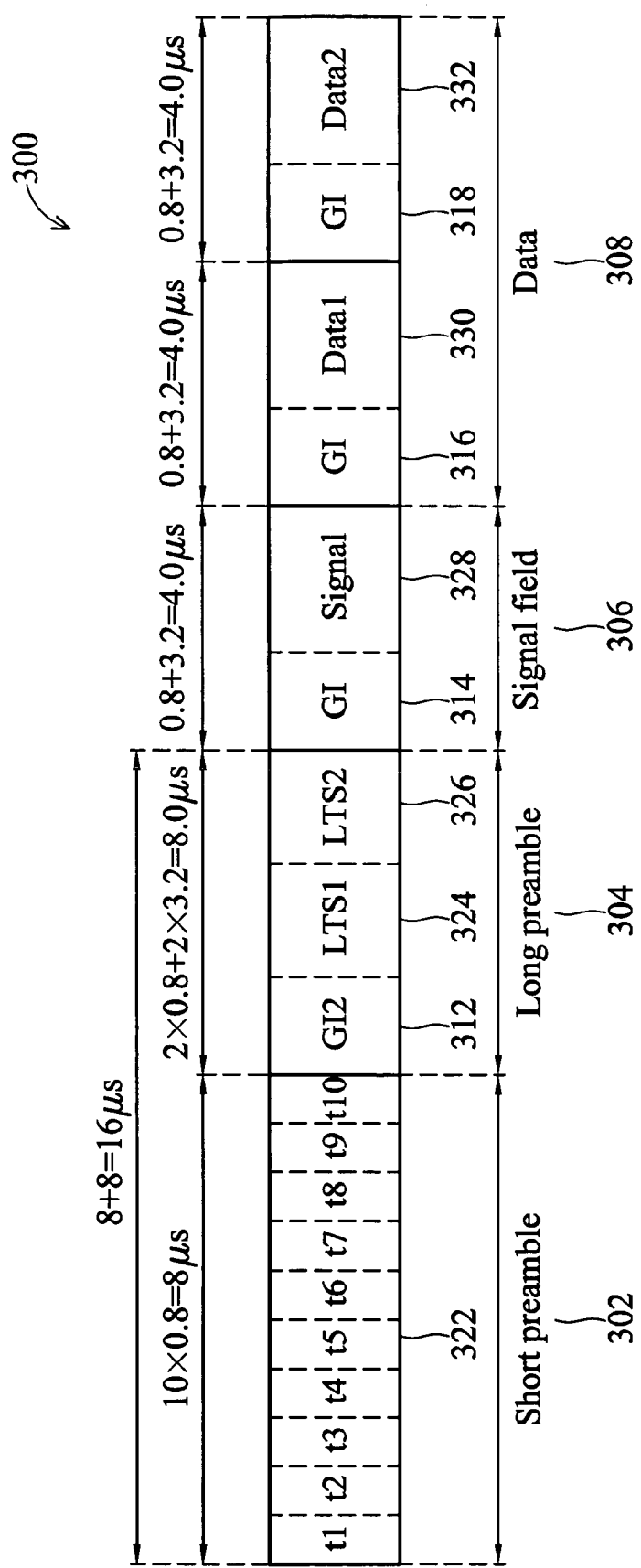
FIG. 3 shows the OFDM burst mode frame structure.
Figure 4:
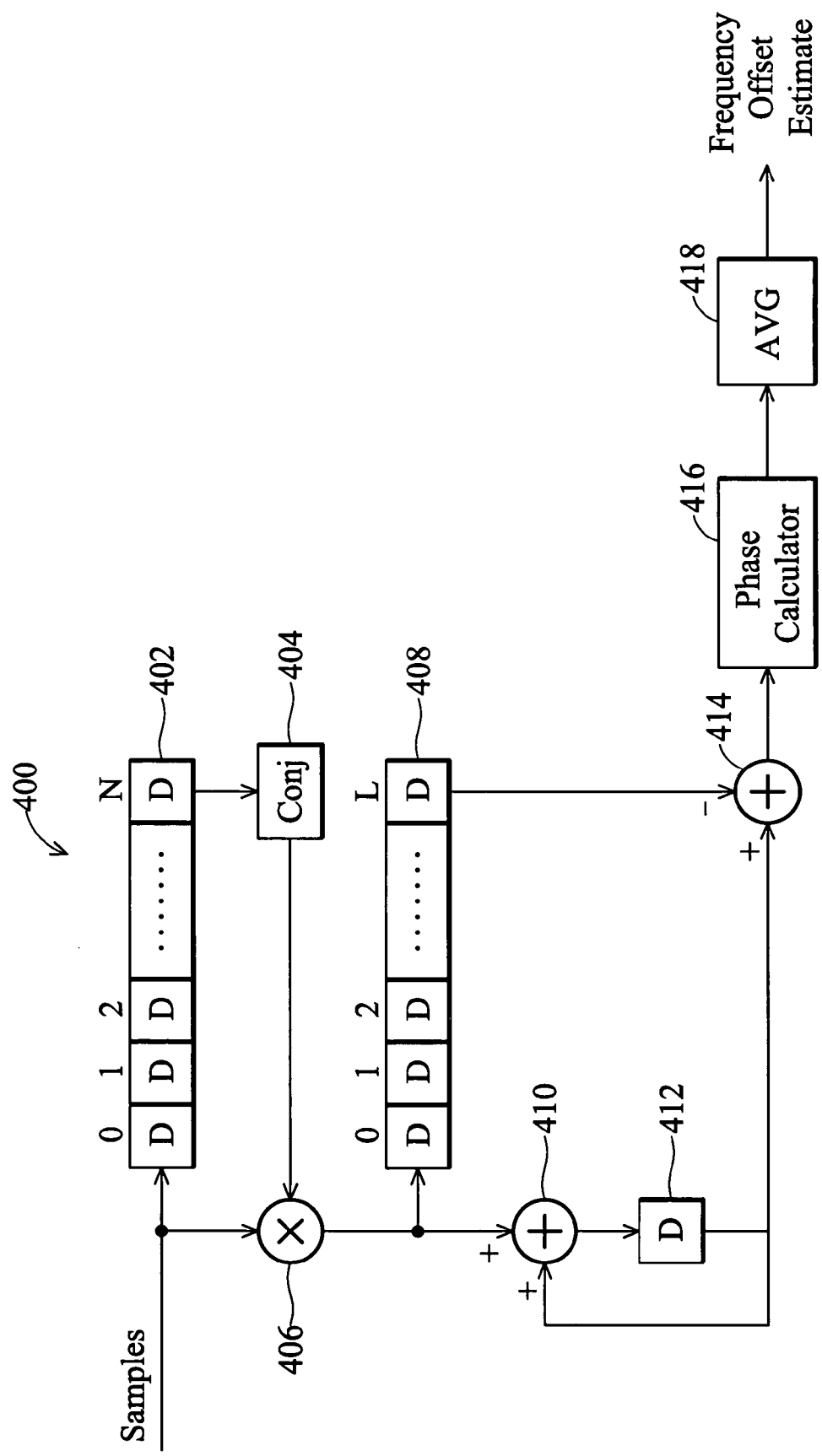
FIG. 4 shows a delay correlation circuit for implementing frequency offset estimation in time domain with short or long preamble.
Figure 5:
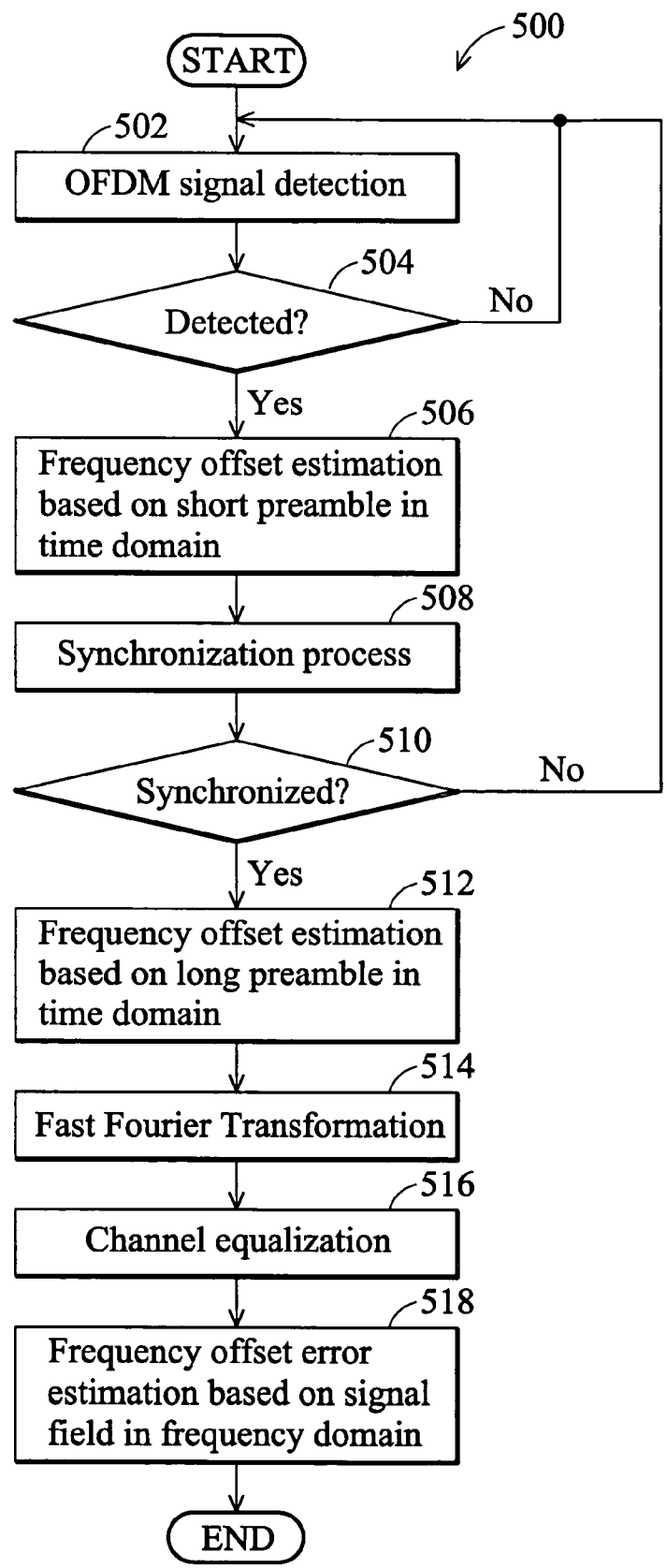
FIG. 5 is a flowchart illustrating an embodiment of a method for signal processing in an OFDM baseband receiver.

FIG. 5 is a flowchart illustrating an embodiment of a method 500 for signal processing in an OFDM baseband receiver. The method 500 combines the frequency offset error estimation step provided by this invention to reduce the frequency offset estimation error of signals in the frequency domain. The method 500 begins with step 502, which detects the existence of the OFDM signal. If the OFDM signal is detected in step 504, step 506 estimates the frequency offset with the short preamble 302 of the signal, and the estimation value here based on short preamble is represented by SPFOE. Step 506 can be implemented with the delay correlation circuit 400 shown in FIG. 4. Because the signal has not been processed by the fast Fourier transformation (FFT) block 212, the signal is still a time domain signal, and the signal after FFT is a frequency domain signal. Then, step 508 implementing a synchronization process as in timing synchronization block 224 shown in FIG. 2. If the synchronization process is achieved in step 510, step 512 estimates the frequency offset with the long preamble 304 of the signal, and the estimation value here based on long preamble is represented by LPFOE. Step 512 can be implemented with the delay correlation circuit 400 shown in FIG. 4. Step 514 then performs the fast Fourier transformation (FFT) of the signal. Step 516 then executes the channel equalization to compensate the signal for channel distortion according to a channel estimation coefficient $H_k$ of the k-th subcarrier. Because the SPFOE in step 506 and LPFOE in step 512 cannot be accurate enough and there is still some frequency offset error left meanwhile, which can affect the performance of the following signal processing processes, thus, step 518 estimates the frequency offset estimation error of the equalized signal in frequency domain with the signal field 328 of the equalized signal, and the OFDM receiver can compensate for the frequency offset error according to the estimation in step 518.

Figure 6:
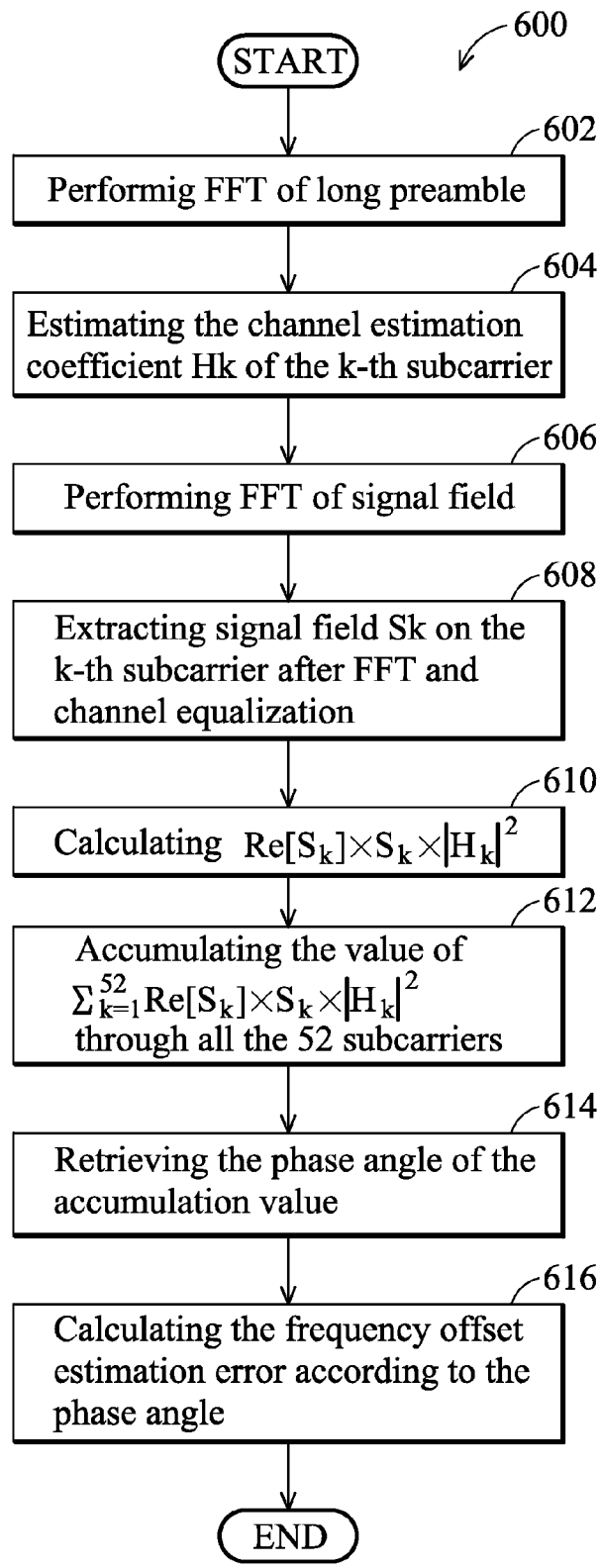
FIG. 6 is a flowchart illustrating an embodiment of a method for frequency offset error estimation with signal field in frequency domain.

FIG. 6 is a flowchart illustrating an embodiment of a method 600 for frequency offset error estimation with signal field 328 in frequency domain. The method 600 begins with step 602, which performs FFT of the long preamble 304 of the signal. Step 604 then estimates a channel estimation coefficient $H_k$ of the k-th subcarrier according to the long preamble processed by step 602. Step 606 performs FFT of the signal field 328 of the signal. Step 608 extracts signal field $S_k$ of the k-th subcarrier from the signal after processing with FFT and channel equalization. Step 610 calculates the value $\text{Re}[S_k] \times S_k \times |H_k|^2$, wherein the $\text{Re}[S_k]$ is the real part of the signal field $S_k$ and $|H_k|^2$ is the square of the absolute value of the channel coefficient $H_k$. Step 612 then accumulates the value $\text{Re}[S_k] \times S_k \times |H_k|^2$ through all 52 subcarriers to generate the accumulated value.

$$\sum_{k=1}^{52} \text{Re}[S_k] \times S_k \times |H_k|^2.$$

In step 614 the phase angle of the accumulated value $$\sum_{k=1}^{52} \text{Re}[S_k] \times S_k \times |H_k|^2$$

is obtained, and in step 616 the frequency offset estimation error can be calculated according to the phase angle. The algorithm of step 616 for calculating the frequency offset estimation error will be further described with FIG. 9.

Figure 7:
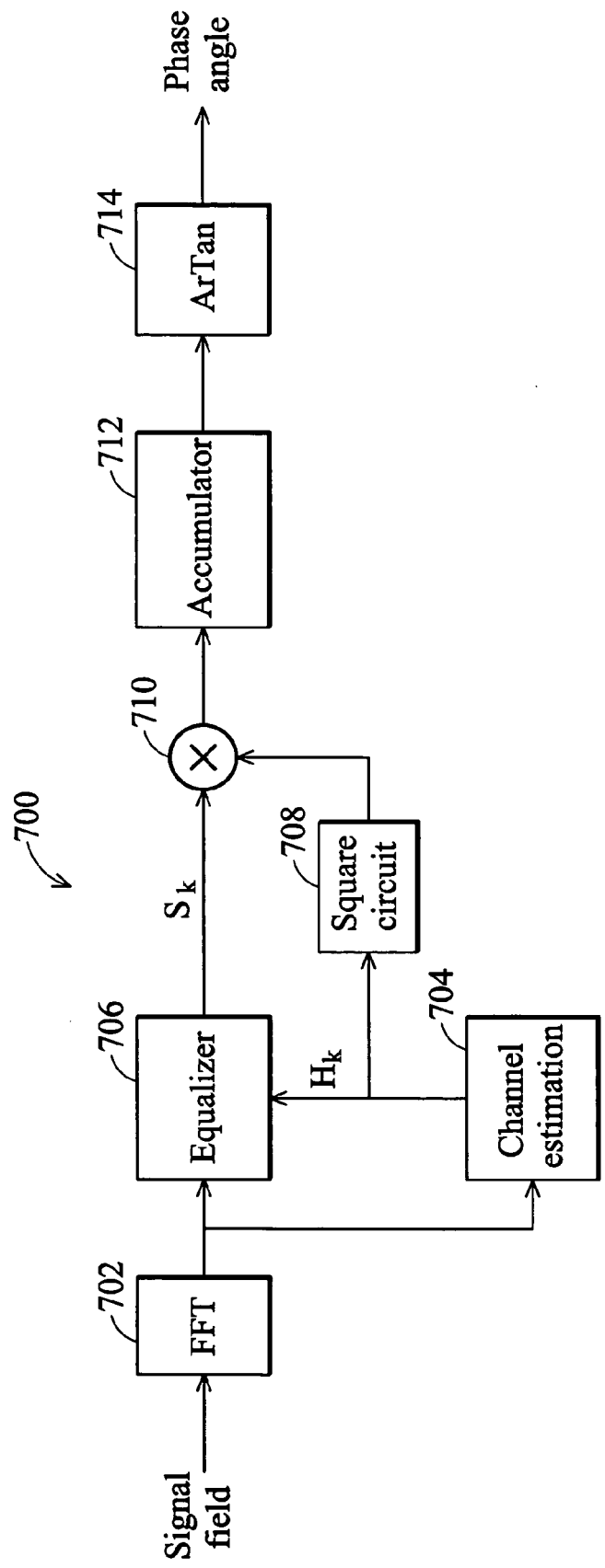
FIG. 7 shows the main function blocks of an embodiment of a circuit for frequency offset error estimation with signal field in frequency domain.

FIG. 7 shows the main function blocks of an embodiment of a circuit 700 for frequency offset error estimation with signal field in frequency domain. The signal field 328 of input signal is first delivered to an FFT block 702 for fast Fourier transformation. After transformation, the signal field 328 is fed to an equalizer 706 for compensating for channel distortion to generate a signal field $S_k$ of the k-th subcarrier according to a channel estimation coefficient $H_k$ of the k-th subcarrier, which is generated from a channel estimation block 704. The square circuit 708 then calculates the square of the absolute value of the channel estimation coefficient $H_k$ to generate $|H_k|^2$, and the real part $\text{Re}[S_k]$ of the signal field $S_k$ is multiplied with the signal field $S_k$ and $|H_k|^2$ to produce the product value $\text{Re}[S_k] \times S_k \times |H_k|^2$ with the multiplier 710. The accumulator 712 then accumulates the product value $\text{Re}[S_k] \times S_k \times |H_k|^2$ through all the 52 subcarriers to generate the accumulated value $$\sum_{k=1}^{52} \text{Re}[S_k] \times S_k \times |H_k|^2,$$

and the ArTan block 714 retrieves the phase angle of the accumulated value $$\sum_{k=1}^{52} \text{Re}[S_k] \times S_k \times |H_k|^2.$$

Thus, the baseband receiver can calculate the frequency offset estimation error value according to the phase angle and compensate the signal for frequency offset error. The equation between the frequency offset error estimation value and the phase angle will be described in the following.

Figure 8:
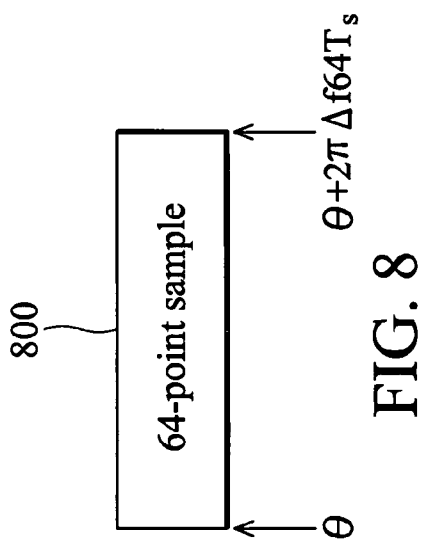
FIG. 8 illustrates the timing of samples of the signal field of the signals.

FIG. 8 illustrates the timing of samples of the signal field 800 of the signals. Because signal field 800 lasts for 3.2 μs and the sampling period is 0.5 μs, there are 64 samples belonging to signal field 800. Assume the frequency offset while the samples of signal field 800 is transformed with FFT is $\Delta f$. If the phase of the first sample of signal field 800 is θ, then the phase of the last sample of signal field 800 is $\theta + 2\pi \Delta f 64 T_s$, wherein Ts is the sampling period, because there are 64 samples in the signal field 800. Thus, the average of the phase of the signal field is $\theta + 2\pi \Delta f 32 T_s$. Therefore we can use the phase of the signal field on 52 subcarriers to estimate the frequency-offset $\Delta f$ according to this formula.

Figure 9:
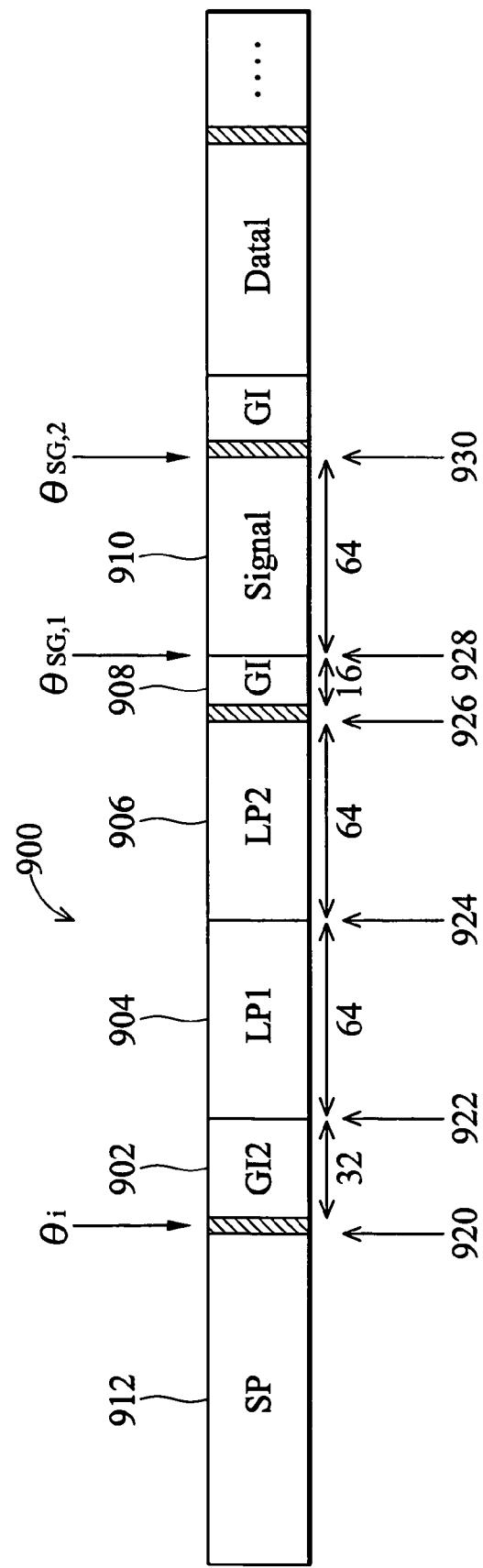
FIG. 9 illustrates the relationship between the OFDM frame structure and the phases of samples based by the formula inferring the value of frequency offset.

FIG. 9 illustrates the relationship between the OFDM frame structure 900 and the phases of samples based by the formula inferring the value of frequency offset. The long preamble region contains guarding interface 902, first long training symbol 904, and second long training symbol 906, and each of them contains 32, 64, and 64 samples respectively. The signal field region contains guarding interface 908 and signal field 910, and each of them contains 16 and 64 samples respectively. Because there are two frequency offset estimations in the time domain based on short preamble (step 506 shown in FIG. 5) and long preamble (step 512 shown in FIG. 5), we assume that the value of the frequency offset based on the short preamble is SPFOE and the value of the frequency offset based on the long preamble is LPFOE. The following describes a situation with no frequency offset estimation based on the long preamble (i.e. LPFOE=0) first, and a situation where frequency offset estimation based on the long preamble is then described thereafter.

Assume that LPFOE=0. If the phase of the last sample 920 of short preamble 912 is $\theta_i$, the phase $\theta_{SG,2}$ of the last sample 930 of signal field 910 due to the frequency offset estimation error after compensated for SPFOE (represented by $\Delta f_{SP}$ here) will be:

$$\theta_{SG,2} = \theta_i + 2\pi \Delta f_{SP}(N_{LP}+N_{SG})T_S = \theta_i + 2\pi \Delta f_{SP} 240 T_S, \quad (1)$$

wherein ($N_{LP}+N_{SG}$) is the number of samples between 920 and 930, and $N_{LP}=32+64+64=160$ and $N_{SG}=16+64=80$. Accordingly, the phase $\theta_{SG,1}$ of the first sample 928 of signal field 910 due to the frequency offset estimation error will be:

$$\theta_{SG,1} = \theta_i + 2\pi \Delta f_{SP}(N_{LP}+N_{GI})T_S = \theta_i + 2\pi \Delta f_{SP} 176 T_S, \quad (2)$$

wherein ($N_{LP}+N_{GI}$) is the number of samples between 920 and 928, and $N_{LP}=160$ and $N_{GI}=16$. Thus, according to equations (1) and (2), the phase $\theta_{SG,FFT}$ signal field 910 after FFT (step 514) is:

$$\theta_{SG,FFT} = \theta_i + 2\pi \Delta f_{SP}[(176+240)/2]T_S = \theta_i + 2\pi \Delta f_{SP} 208 T_S. \quad (3)$$

If channel estimation has been applied to the signal, the compensation of phase $\theta_{CE}$ due to channel estimation must be calculated. The compensated phase $\theta_{CE,1}$ by channel estimation with the first long training symbol is:

$$\theta_{CE,1} = \theta_i + 2\pi \Delta f_{SP}[(32+96)/2]T_S = \theta_i + 2\pi \Delta f_{SP} 64 T_S, \quad (4)$$

wherein the 32 is the number of samples between 920 and the first sample 922 of the first long training symbol 904, and 96 is the number of samples between 920 and the last sample 924 of the first long training symbol 904. Accordingly, the compensated phase $\theta_{CE,2}$ by channel estimation with the second long training symbol is:

$$\theta_{CE,2} = \theta_i + 2\pi \Delta f_{SP}[(96+160)/2]T_S = \theta_i + 2\pi \Delta f_{SP} 128 T_S, \quad (5)$$

wherein the 96 is the number of samples between 920 and the first sample 924 of the second long training symbol 906, and 160 is the number of samples between 920 and the last sample 926 of the second long training symbol 906. Thus, according to equations (4) and (5), the compensated phase $\theta_{CE}$ by channel estimation using both long training symbols is:

$$\theta_{CE}=(\theta_{CE,1}+\theta_{CE,2})/2=\theta_i+2\pi\Delta f_{SP}96T_S. \quad (6)$$

Therefore, the phase $\theta_{SG}$ of signal field 910 after channel equalization (step 516) is:

$$\theta_{SG}=\theta_{SG,FFT}-\theta_{CE}=2\pi\Delta f_{SP}112T_S. \quad (7)$$

The phase $\theta_{SG}$ of signal field 910 after channel equalization can be determined by the following equation:

$$\theta_{SG} = A\text{rTan}\sum_{k=1}^{52}[\text{Re}(S_k)\times S_k \times |H_k|^2], \quad (8)$$

wherein $S_k$ is signal field 910 signal on the k-th subcarrier, and $H_k$ is the channel estimation coefficient. Since the value of $\theta_{SG}$ is known from equation (8), the SPFOE error $\Delta f_{SP}$ can be obtained with the following equation deduced from equation (7):

$$\Delta f_{SP}=\theta_{SG}/(2\pi \times 112 \times T_S)(Hz). \quad (9)$$

The 112 in denominator of equation (9) can be simplified as 113 to be quantized to $(\frac{1}{2}^7+\frac{1}{2}^{10})$.

Next, we consider the situation in which the frequency offset estimation based on the long preamble is applied. Assume the estimate LPFOE of the frequency offset estimation based on long preamble is $f_{LP}$. Thus, the phase $\theta_{SG,2}$ of the last sample 930 of signal field 910 due to the frequency offset estimation error after compensated for SPFOE (represented by $\Delta f_{SP}$ here) and LPFOE (represented by $f_{LP}$) will be:

$$\theta_{SG,2} = \theta_i + 2\pi\Delta f_{SP}(N_{LP} + N_{SG})T_S - 2\pi f_{LP}N_{SG}T_S \quad (10)$$

$$= \theta_i + 2\pi f_{SP}240T_S - 2\pi f_{LP}80T_S.$$

Accordingly, the phase $\theta_{SG,1}$ of the first sample 928 of signal field 910 due to the frequency offset estimation error will be:

$$\theta_{SG,1} = \theta_i + 2\pi\Delta f_{SP}(N_{LP} + N_{G1})T_S - 2\pi f_{LP}N_{G1}T_S \quad (11)$$

$$= \theta_i + 2\pi\Delta f_{SP}176T_S - 2\pi f_{LP}16T_S.$$

Thus, according to equation (10) and (11), the phase $\theta_{SG,FFT}$ of signal field 910 after FFT (step 514) is:

$$\theta_{SG,FFT}=(\theta_{SG,1}+\theta_{SG,2})/2=\theta_i 2\pi\Delta f_{SP}208T_S-2\pi f_{LP}48T_S, \quad (12)$$

The compensated phase $\theta_{CE}$ by channel estimation is still determined by equation (6). Therefore, the phase $\theta_{SG}$ of signal field 910 after channel equalization (step 516) is:

$$\theta_{SG}=\theta_{SG,FFT}-\theta_{CE}=2\pi\Delta f_{SP}112T_S-2\pi f_{LP}48T_S. \quad (13)$$

If we substitute the SPFOE error $\Delta f_{SP}$ by $\Delta f_{LP}+f_{LP}$, wherein the $\Delta f_{LP}=\Delta f_{SP}-f_{LP}$ is the frequency offset estimation error after compensation for SPFOE $\Delta f_{SP}$ and LPFOE $f_{LP}$, the equation (13) becomes:

$$\theta_{SG}2\pi(\Delta f_{LP}+f_{LP})112T_S-2\pi f_{LP}48T_S. \quad (14)$$

Since the value of $\theta_{SG}$ is still determined by equation (8), the LPFOE error $\Delta f_{LP}$ can be obtained with the following equation deduced from equation (14):

$$\Delta f_{LP}=(\theta_{SG}-2\pi\times f_{LP}\times 64\times T_S)/(2\pi\times 112\times T_S)(Hz). \quad (15)$$

In this disclosure, we provide a simple method for estimating frequency offset estimation errors with signal field in the frequency domain in the IEEE 802.11a/g OFDM system. The estimation is done with signal field after FFT, that is, in the frequency domain compared to the delay-correlation circuit in the time domain. Because the estimation of frequency offset estimation error is enforced after the frequency offset estimation based on the short and long preambles, it can reduce the error of frequency offset estimation by delay-correlation circuit.

Finally, while the invention has been described by way of example and in terms of the above, it is to be understood that the invention is not limited to the disclosed embodiment. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A circuit for frequency offset estimation in frequency domain for a receiver of an orthogonal frequency division multiplexing (OFDM) system, wherein an input signal of the circuit is transmitted via 52 subcarriers of the OFDM system, the circuit comprising:

a fast Fourier transformation module, for processing the input signal with fast Fourier transformation (FFT) to generate a first signal;

a channel estimation module, coupled to the fast Fourier transformation module, for estimating a channel estimation coefficient of a k-th subcarrier of the 52 subcarriers, wherein the index k ranges from 1 to 52 and represents the order of subcarrier;

an equalizer, coupled to the fast Fourier transformation module and the channel estimation module, for compensating the first signal for channel distortion with the channel estimation coefficient to generate a second signal;

a square circuit, coupled to the channel estimation module, for calculating a square of an absolute value of the channel estimation coefficient of the k-th subcarrier;

a multiplier, coupled to the equalizer and the square circuit, for multiplying the signal field of the second signal on the k-th subcarrier by its real part and the square of the absolute value of the channel estimation coefficient of the k-th subcarrier to generate a product value regarding the k-th subcarrier;

an accumulator, coupled to the multiplier, for accumulating the product value regarding all the 52 subcarriers to generate an accumulation value;

an ArTan module, coupled to the accumulator, for calculating a phase angle of the accumulation value; and a frequency offset error module, estimating a frequency offset error with at least one frequency offset estimation process based on a short preamble in time domain according to a ratio of the phase angle and a sampling period of the OFDM system.

2. The circuit according to claim 1, wherein the at least one frequency offset estimation process in time domain includes a frequency offset estimation process based on short preamble, and the frequency offset error is estimated by a following equation:

$$\Delta f_{SP} = \theta_{SG}/(2\pi \times 112 \times T_S)(Hz);$$

wherein $\Delta f_{SP}$ is the frequency offset error originating from the frequency offset estimation process based on short preamble;

$\theta_{SG}$ is the phase angle; and $T_S$ is a sampling period of the receiver of the OFDM system.

3. The circuit according to claim 1 further comprising a delay correlation circuit, coupled to the fast Fourier transformation module, for estimating and compensating the frequency offset of the input signal in time domain before the input signal is delivered to the fast Fourier transformation module.

* * * * *